(12) United States Patent
Sharp (10) Patent No.: US 6,741,761 B2
(45) Date of Patent: May 25, 2004

(54) METHOD FOR ACHIEVING IMPROVED TRANSMISSION PERFORMANCE OVER FIBER USING A MACH-ZEHNDER MODULATOR

(75) Inventor: Richard Sharp, Wayland, MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 315 days.

(21) Appl. No.: 09/896,417

(22) Filed: Jun. 28, 2001

(65) Prior Publication Data

US 2003/0002765 A1 Jan. 2, 2003

(51) Int. Cl.$^7$ .............................................. G02F 1/035
(52) U.S. Cl. ..................... 385/2; 385/3; 385/4; 359/246
(58) Field of Search ..................... 385/2, 3, 4; 359/161, 359/248

(56) References Cited

U.S. PATENT DOCUMENTS

| | | | | |
|---|---|---|---|---|
| 5,524,076 A | * | 6/1996 | Rolland et al. ................. | 385/8 |
| 5,778,113 A | * | 7/1998 | Yu ................................. | 385/3 |
| 5,991,471 A | * | 11/1999 | Yu ................................. | 385/3 |
| 6,031,945 A | * | 2/2000 | You et al. ...................... | 385/14 |
| 2002/0141027 A1 | * | 10/2002 | LaGasse et al. ............ | 359/237 |

* cited by examiner

Primary Examiner—Akm Enayet Ullah
Assistant Examiner—Sung Pak
(74) Attorney, Agent, or Firm—Lahive & Cockfield, LLP (57) ABSTRACT

A method for improving the bit error rate of a modulated optical signal transmitted over single mode fiber is provided. The modulating voltage supplied to a single arm or alternatively to both arms of a Mach-Zehnder modulator is increased to result in a reduced extinction ratio of the modulated optical signal. This results in an optimum optical signal with a reduced bit error rate at a receiver coupled to the Mach-Zehnder modulator.

24 Claims, 9 Drawing Sheets

METHOD FOR ACHIEVING IMPROVED TRANSMISSION PERFORMANCE OVER FIBER USING A MACH-ZEHNDER MODULATOR

TECHNICAL FIELD OF THE INVENTION

The present invention generally relates to optical networks and more particularly, to a method for modulating an optical communications signal.

BACKGROUND OF THE INVENTION

A Mach-Zehnder modulator (MZM) is a device that is commonly used to produce a modulated optical carrier in an optical network. The MZM can modulate the intensity of a light signal with a voltage drive signal. Typically, an MZM includes two phase modulator arms and a splitter, such as a Y-junction splitter, at the front end to split a continuous-wave (CW) light signal between the two phase modulator arms. A combiner, such as a Y-junction combiner, is coupled to the other end of the two phase modulator arms to combine the phase shifted light signals. If the light signals are in phase when recombined in the Y-junction combiner, they are coupled into a single mode output waveguide. If the light signals are out of phase when recombined in the Y-junction combiner, they are transformed into a higher order mode and lost into the substrate of the MZM.

The voltage drive signal that controls the phase shift of the CW light signal is supplied to either a single electrode attached to one arm of the MZM for single arm drive or supplied to electrodes attached to both arms of the MZM for dual arm drive. Because the MZM modulates the intensity of the CW light signal with a voltage drive signal to produce a modulated optical signal, the greater the light intensity ratio between the "on" state of the modulated optical signal and the "off" state of the modulated optical signal results in a modulated optical signal with fewer bit errors. This light intensity ratio is known in the art as the extinction ratio (ER) and is the measure of the modulated optical signal's light intensity against the background noise. As a result, the generation of a high ER produces a higher quality optical signal that permits a greater span between repeaters in the optical network.

SUMMARY OF THE INVENTION

The present invention provides an approach to improve the bit error rate of a modulated optical signal over positive dispersive fiber by generating a modulated optical signal with a less than maximum ER.

In one embodiment of the present invention, a method for processing an optical signal in an optical communications network is practiced. The optical signal is input into an optical modulator and the optical modulator is over-driven with a modulation voltage signal. Consequently, the over-driving of the optical modulator results in a reduced ER that yields an improved bit error rate at a receiver.

The above-described approach benefits an optical communication network in that the quality of service can be improved for all network customers by overdriving an optical modulator. Moreover, the overdriving of the optical modulator with the modulation voltage signal reduces the bit error rate of the modulated signal as received at the end of a single mode fiber conductor.

In accordance with another aspect of the present invention, a method is performed to improve the bit error rate of an optical signal transmitted over an optical transmission medium. By providing a stabilized light beam to an optical modulator and overdriving the modulator with a voltage signal, the optical signal's extinction ratio at the receiver is reduced, but the bit error rate of the optical signal is improved. In one embodiment, the optical modulator is a semiconductor Mach-Zehnder modulator and in another embodiment, the optical modulator is a lithium niobate Mach-Zehnder modulator.

The above-described approach allows the use of an off-the-shelf Mach-Zehnder modulator to produce an improvement in an optical signal's bit error rate. In this manner, an optical network provider can improve the network's quality of service with minimal disruption to service. The time to implement the improvement is minimal, as is the cost to implement the improvement. Furthermore, the improvement can be realized without adding complexity to the software and hardware that control the optical modulator. As a result, a significant improvement in an optical signal bit error rate can be attained with a minimal impact to existing optical network hardware and software.

BRIEF DESCRIPTION OF THE DRAWINGS

An illustrative embodiment of the present invention will be described below relative to the following drawings.

DETAILED DESCRIPTION OF AN ILLUSTRATIVE EMBODIMENT

The illustrative embodiment of the present invention provides a method for improving the bit error rate of a modulated optical signal. In the illustrative embodiment an optical modulator, such as an MZM is overdriven to reduce the extinction ratio of the modulated optical signal. Consequently, the extinction ratio is reduced and the bit error rate of the modulated optical signal is improved.

In the illustrative embodiment, the method is attractive for use in optical communication networks that utilize MZM's to produce modulated optical signals. The method allows the optical network operator to increase quality of service by reducing bit error rates without having to make substantial hardware and software modifications to existing optical network equipment. Moreover, the method of the illustrative embodiment may be implemented into existing optical communication networks without major capital expenditures. Consequently, the optical signal quality and reliability can be significantly improved with minimal modifications to network hardware and software with minimal expense.

In order to help clarify the discussion below, it is helpful to define a few terms. The term "overdrive" refers to a modulation voltage signal level that exceeds the voltage level necessary to produce 100% modulation of the carrier.

Figure 1:
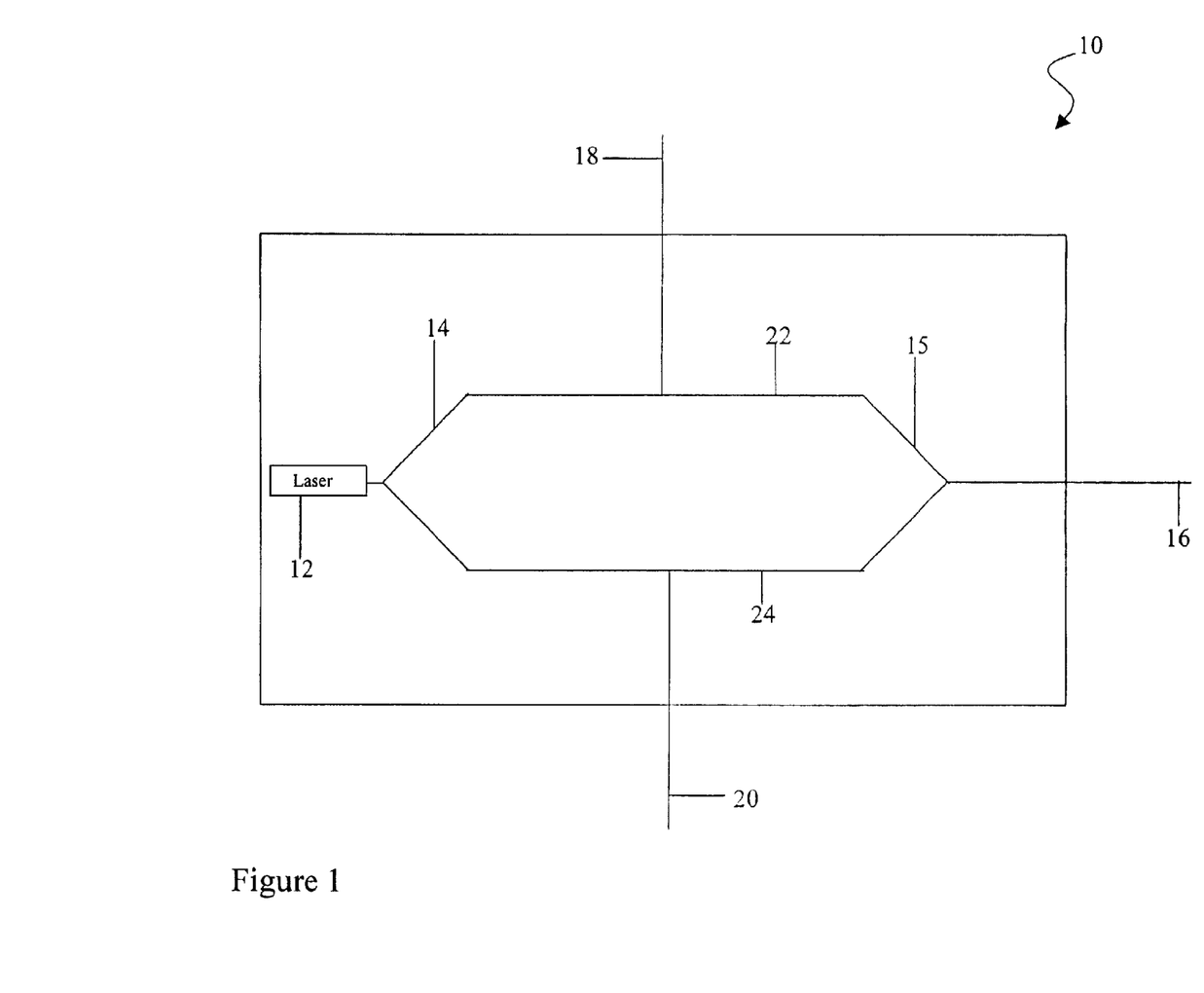
FIG. 1 depicts a Mach-Zehnder modulator suitable for practicing the illustrative embodiment of the present invention.

FIG. 1 illustrates an exemplary MZM 10 that is suitable for practicing the illustrative embodiment of the present invention. The exemplary MZM 10 includes an optical waveguide splitter 14, also known as an input Y branch waveguide splitter. The MZM 10 also includes an optical waveguide combiner 15 ("Y branch waveguide combiner") and waveguide arms 22 and 24. Those skilled in the art will recognize that the input splitter and the output combiner may be implemented by methods other than Y-junctions, as for example, by the use of Mode-Medium Interaction regions, or MMI devices.

Electrodes 18 and 20 are coupled to waveguide arms 22 and 24 respectively, to provide the exemplary MZM 10 with the modulation voltage signal. The optical waveguide combiner 15 is coupled to the output waveguide part 16 that in turn is connected to a single mode fiber optic transmission path. The laser 12 can be an integrated (on chip) laser, such as a laser diode, to provide the CW light signal input to the optical waveguide splitter 14. Those skilled in the art will recognize that the laser 12 is an optional laser and that a laser external to the exemplary MZM 10 is also suitable for providing the CW light signal to the input of the optical waveguide splitter 14. In the illustrative embodiment of the present invention, the exemplary MZM 10 and laser 12 are manufactured under the part number LCM155EW-64 by Nortel Networks Corporation of Brampton, Ontario, Canada. The single mode fiber is an SMF-28 fiber. The modulation rate used herein to discuss operation of an illustrative embodiment of the present invention is approximately 10 Gbps.

In operation, CW light from the laser 12 is coupled to the optical waveguide splitter 14. The beam is split by the optical waveguide splitter 14 and the two beams travel along arms 22 and 24 and combine at the optical waveguide combiner 15. The combined light beam exits the exemplary MZM 10 at the output waveguide port 16. As it is known in the art, an electro-optic effect in the arms 22 and 24 provides a phase change in the light propagating through the arms depending on the modulating voltage applied to the electrodes 18 and 20. Thus, with no modulating voltage applied to the electrodes 18 and 20, the beams traveling through the arms 22 and 24 (assumed for simplicity here to have equal path length) arrive at the optical waveguide combiner 15 in phase, to result in output signal having maximum amplitude. If a modulated voltage signal is applied to only one of the arms, for example electrode 20, a phase change occurs in that arm due to the electro-optic effect. For an appropriate modulation voltage the phase change can be set to 180 degrees with respect to the unmodulated arm. The optical signal arrives at the optical waveguide combiner 15 completely out of phase with respect to the nonmodulated arm, resulting in an output signal with a minimum amplitude. Hence, by controlling the modulation voltage signal to electrode 18 or electrode 20 or both, the exemplary MZM 10 can be operated to convert a CW light signal into a high bit rate modulated optical signal.

A common material for manufacturing MZM's is lithium niobate. The material produces a linear phase response to the applied modulation voltage signal. While lithium niobate MZM's produce a well-controlled chirp parameter, they are relatively large, expensive, and require bias-control circuitry due to the pyroelectric nature of lithium niobate. As an alternative, semiconductor MZM's that are not pyroelectric can be used in place of a lithium niobate MZM's when package size, cost, and bias-control circuit complexity are an issue. An additional alternative includes polymer-based MZM's that offer reduced Vpi values.

The exemplary MZM 10 may be driven by either single-arm modulation or dual-arm modulation. For single-arm modulation, the modulation voltage signal applied to the electrode 20 is modulated between 0 volts and −4 volts and the voltage at electrode 18 is kept at a constant voltage level such as −2 volts. If dual-arm modulation is desired, then a modulating voltage signal is applied to electrode 18 and 20 in a differential manner. For example, the voltage to electrode 20 is modulated between 0 volts and −2 volts, while the voltage to electrode 18 is modulated between −2 volts and −4 volts. Those skilled in the art will recognize that other modulation voltage values and techniques may be utilized to drive the exemplary MZM 10 based on the particular properties of the MZM device utilized and the optical transmission rate desired.

Figure 2:
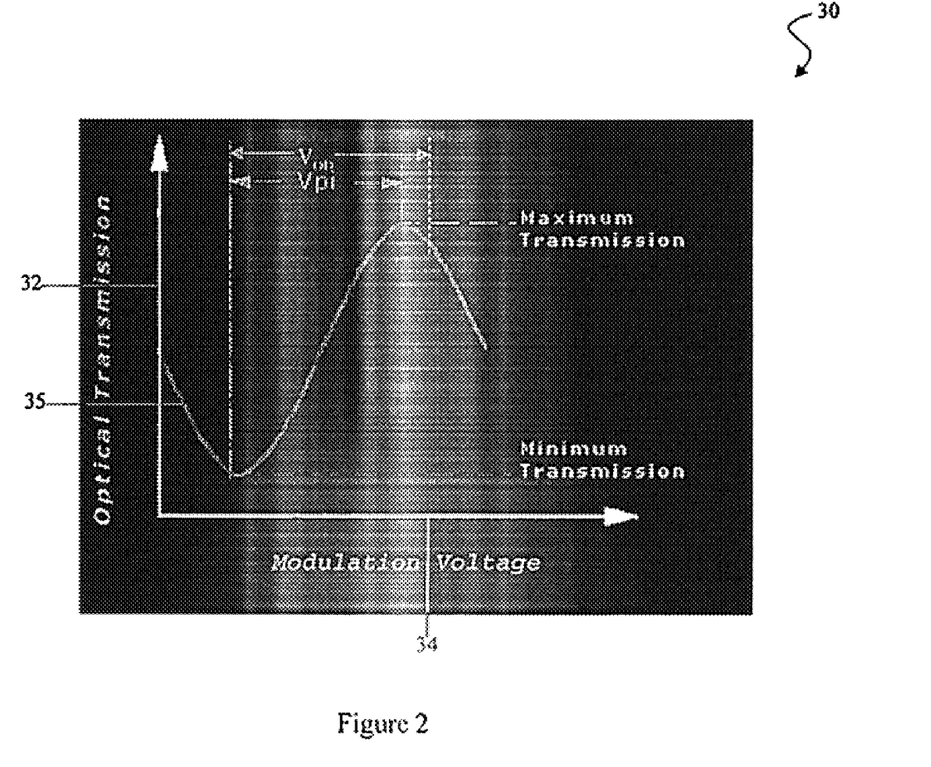
FIG. 2 depicts an exemplary modulation voltage signal suitable for overdriving the Mach-Zehnder modulator of the illustrative embodiment of the present invention.

FIG. 2 graphically illustrates an exemplary modulation voltage signal 30. The vertical axis 32 represents the optical transmission intensity and the horizontal axis 34 indicates the modulation voltage magnitude. Vpi represents the modulation voltage signal 35 for the exemplary MZM 10 to achieve the maxima and minima in the optical transfer response to result in the maximum ER of the modulated optical signal. $V_{OD}$ represents the magnitude of the modulation voltage signal 35 asserted at the electrode 18 or the electrode 20 to overdrive the exemplary MZM 10 and reduce the ER of the modulated optical signal, which, in turn, improves the bit error rate of the modulated optical signal.

Figure 3:
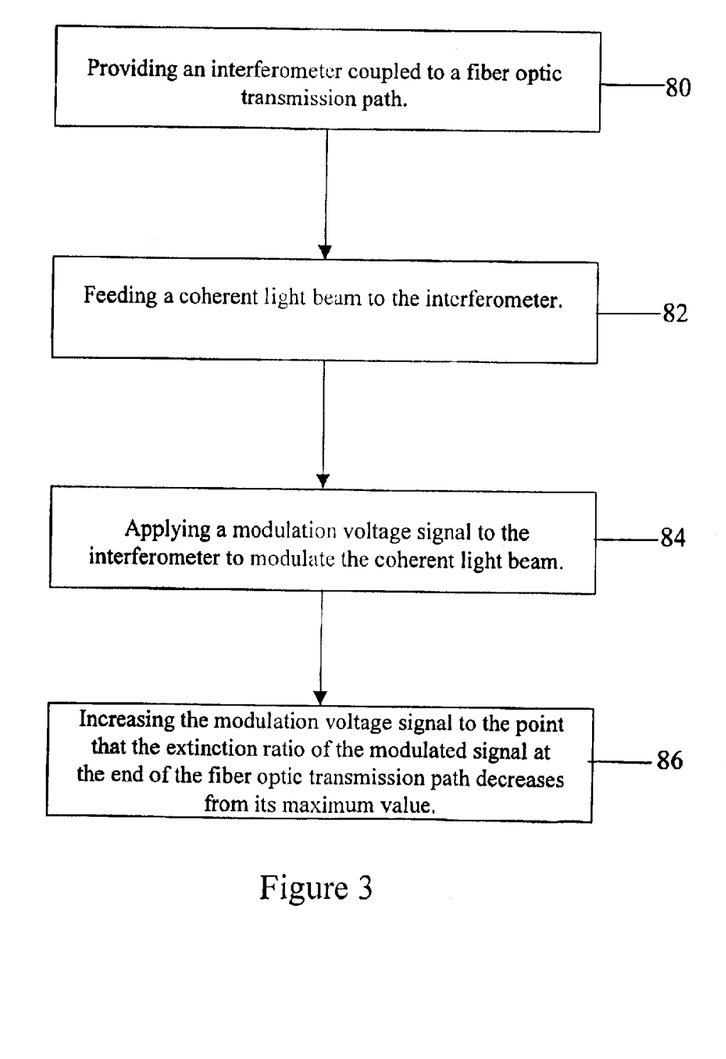
FIG. 3 is a flow chart illustrating the steps taken to practice the illustrative embodiment of the present invention.

To improve the bit error rate of a modulated optical signal at the receiver of the modulated optical signal, the exemplary MZM 10 (which can be a semiconductor MZM or a lithium niobate MZM) is coupled to a single mode fiber optic transmission path for transmission of a single mode of light as a carrier (step 80 in FIG. 3). Once the exemplary MZM 10 is coupled to the fiber optic transmission path, the exemplary MZM 10 is driven with a CW light source, such as a distributed feedback (DFB) laser (step 82 in FIG. 3). To modulate the CW light beam supplied by the DFB, a modulating voltage signal is applied to one or both arms of the exemplary MZM 10 to phase shift the optical signal in the first arm of the exemplary MZM 10 relative to the optical signal in the second arm of the exemplary MZM 10 to produce a modulated optical at the output of the exemplary MZM 10 (step 84 in FIG. 3).

To improve the bit error rate of the modulated optical output signal at the receiver coupled to the other end of the single mode fiber transmission path, the modulation voltage signal is increased until the exemplary MZM 10 is overdriven. Overdriving of the exemplary MZM 10 is indicated by a reduction in the ER of the modulated optical output signal at the receiver (step 86 in FIG. 3). As a result of overdriving the exemplary MZM 10, the bit error rate of the modulated optical output signal over fiber is improved. In measurements taken, a ten percent reduction in the voltage level of the modulation voltage signal that produces the near maximum ER for the exemplary MZM 10 produced an optical signal with an ER that was reduced by 0.2 dB to 0.4 dB from maximum. Conversely, the measurements taken indicate that a ten percent increase in the voltage level of the modulation voltage signal that produces the near maximum ER for the exemplary MZM 10 produced a data signal with an ER that was reduced by 0.4 dB from maximum to produce a greater improvement in the bit error rate of the optical signal than by underdriving the exemplary MZM 10. Those skilled in the art will recognize that the ten percent increase in modulation voltage is empirically derived, and that factors such as modulator type, modulator age, modulator manufacturer, modulator temperature, CW source, fiber distance, and the like, can contribute to the determination of the modulator voltage level to overdrive a particular MZM configuration. The details of the generation of a modulated data signal with a less than maximum ER by overdriving the exemplary MZM 10 are discussed below with reference to FIG. 9.

Figure 4:
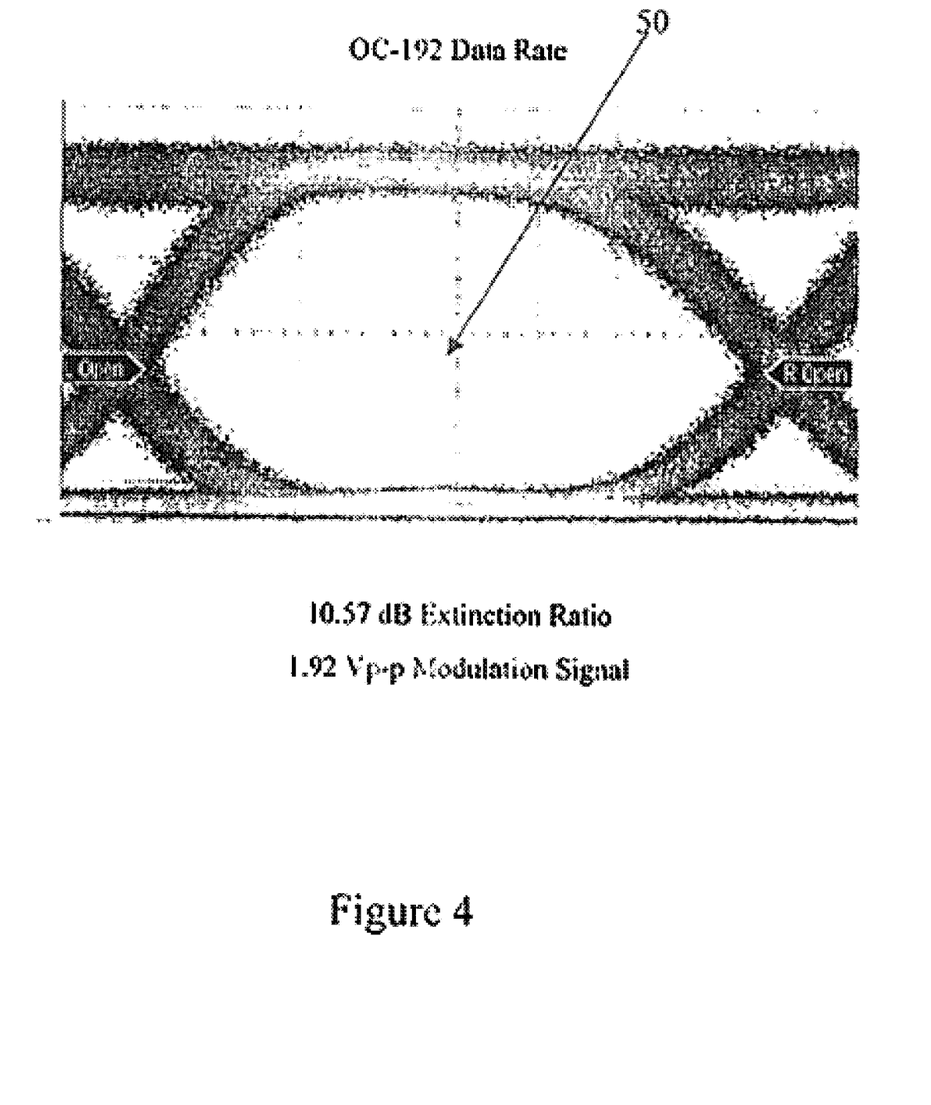
FIG. 4 depicts an exemplary eye of a data pulse with a maximum extinction ratio.

An eye diagram of a modulated optical signal produced by the exemplary MZM 10 is illustrated in FIG. 4. The optical eye diagram 50 illustrates the maximum ER produced by the exemplary MZM 10 as measured before propagation over an SMF-28 fiber transmission path. The optical eye 50 has an ER equal to 10.57 dB. The optical eye 50 is produced with a 1.92 Vpp (Volts, peak to peak) modulated voltage signal.

Figure 5:
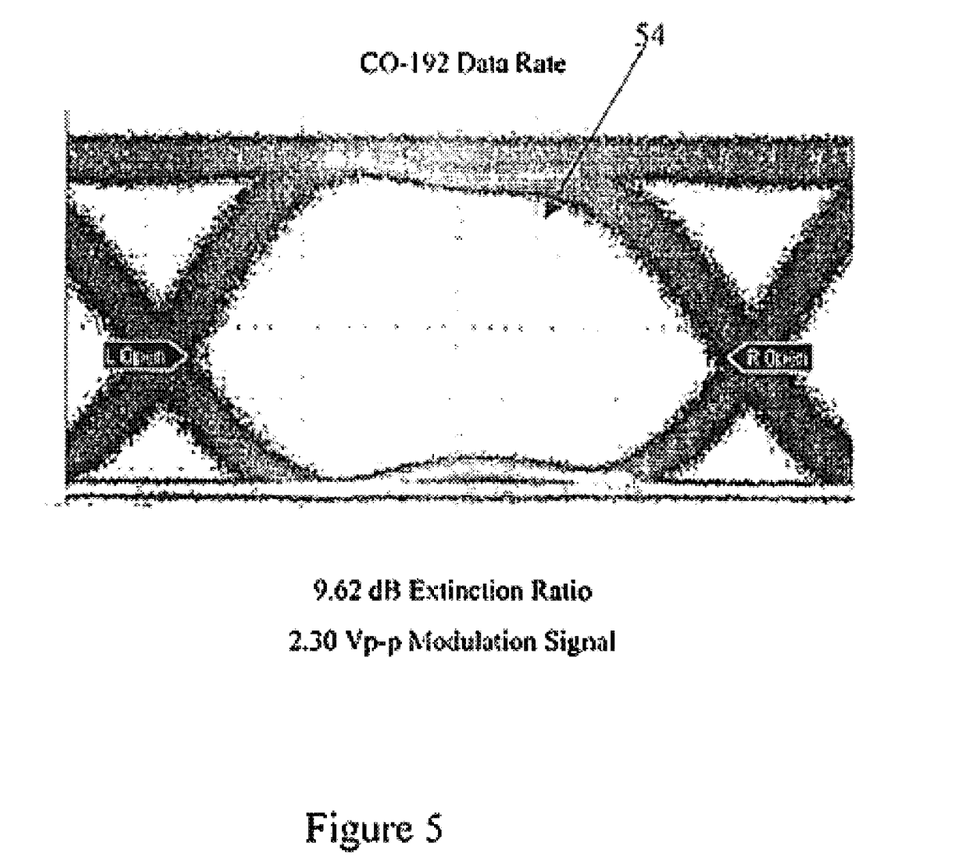
FIG. 5 depicts the eye of an optical data pulse that depicts a reduced extinction ratio caused by overdriving the Mach-Zehnder modulator in accordance with the illustrative embodiment of the present invention.

The optical eye diagram 54 of the modulated optical signal in FIG. 5 illustrates the results of overdriving the exemplary MZM 10. As illustrated, the optical eye diagram 54 has a 9.62 dB ER. The optical eye diagram 54 is produced by overdriving its exemplary MZM 10 with a 2.30 Vpp modulated voltage signal. Nevertheless, the optical eye diagram 54 with its reduced ER value yields an improved bit error rate or a higher Q value when measured against the residual dispersion of the modulated optical signal as will be shown in more detail below.

Figure 6:
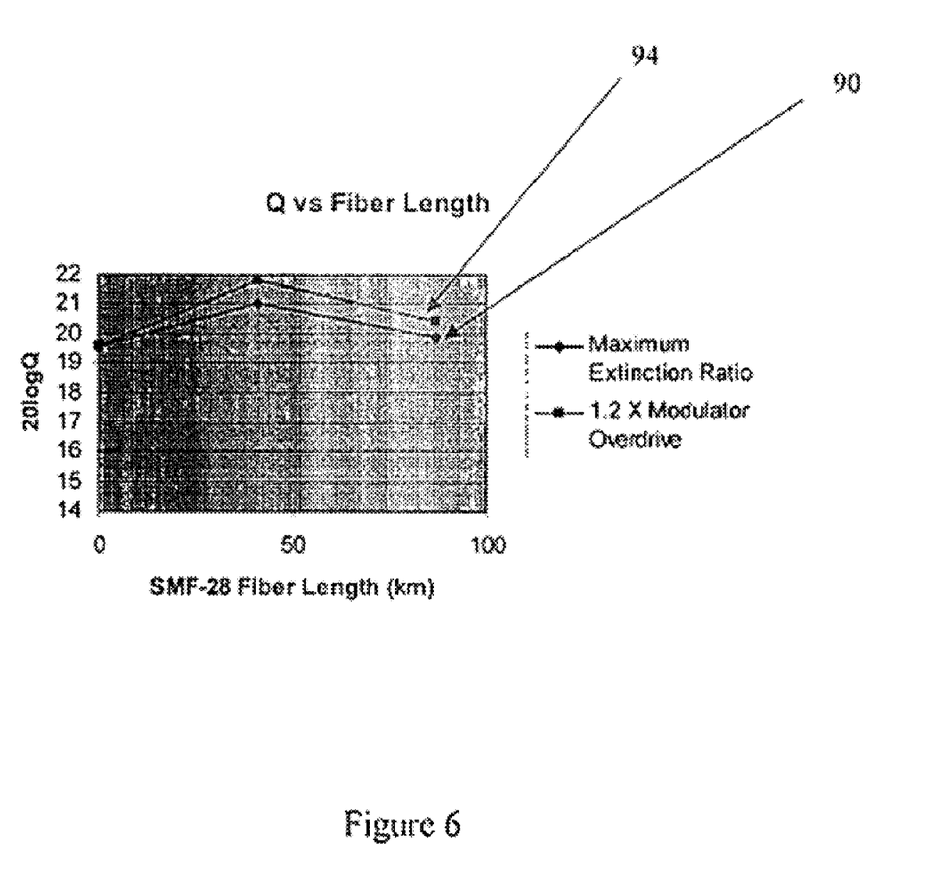
FIG. 6 illustrates data of optimized bit error rate (Q) versus fiber length for a semiconductor Mach-Zehnder modulator at maximum extinction ratio and in an overdriven condition whereby the ER is reduced by 1 dB from its maximum value.

FIG. 6 illustrates data obtained with the exemplary semiconductor MZM that demonstrates the improvement in optimized bit error rate (Q factor, here given in dB as 20 log Q) over various lengths of SMF-28 fiber when the modulator is overdriven to produce an ER 1 dB smaller than the maximum value. The data curve 94 shows that the Q factor can be improved by from about 0.5 to about 0.75 dB after propagation over 41 and 87 km of SMF-28 fiber when the modulator is overdriven relative to the results shown in curve 90 obtained at maximum ER. The overdriving factor here is 1.2 and is derived by dividing 2.30 Vpp by 1.92 Vpp.

Figure 7:
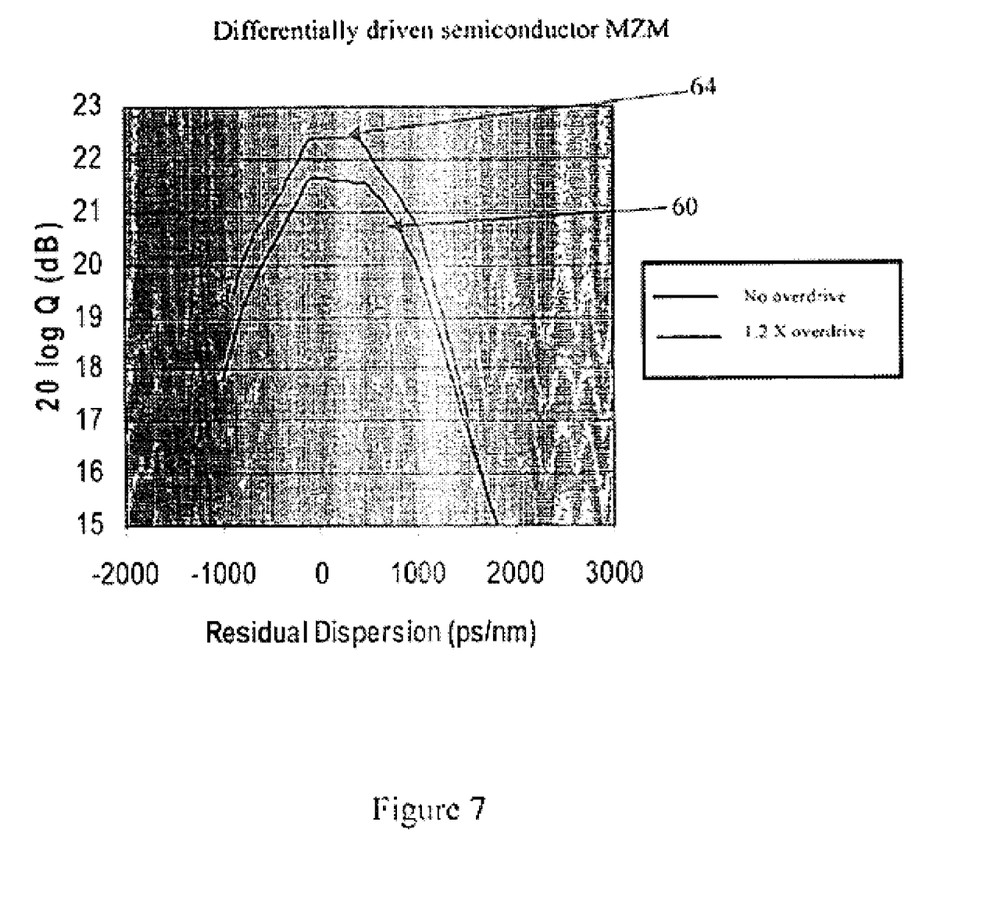
FIG. 7 illustrates simulations of optimized bit error rate (Q) versus residual dispersion as a function of modulation driving conditions for a semiconductor Mach-Zehnder modulator.

FIG. 7 illustrates the results of a modeling simulation that graphically depicts the improvement in signal quality (Q factor) realized by differentially overdriving a semiconductor MZM as measured against fiber residual dispersion. As FIG. 7 illustrates, the modulated optical signal produced by differentially driving a semiconductor MZM with no overdrive (maximum ER) produces a modulated optical signal having the Q factor indicated by the curve 60. By contrast, the modulated optical produced by differentially overdriving the semiconductor MZM (reduced ER) by a factor of 1.2 produces the modulated optical signal having the Q factor indicated by the curve 64.

Figure 8:
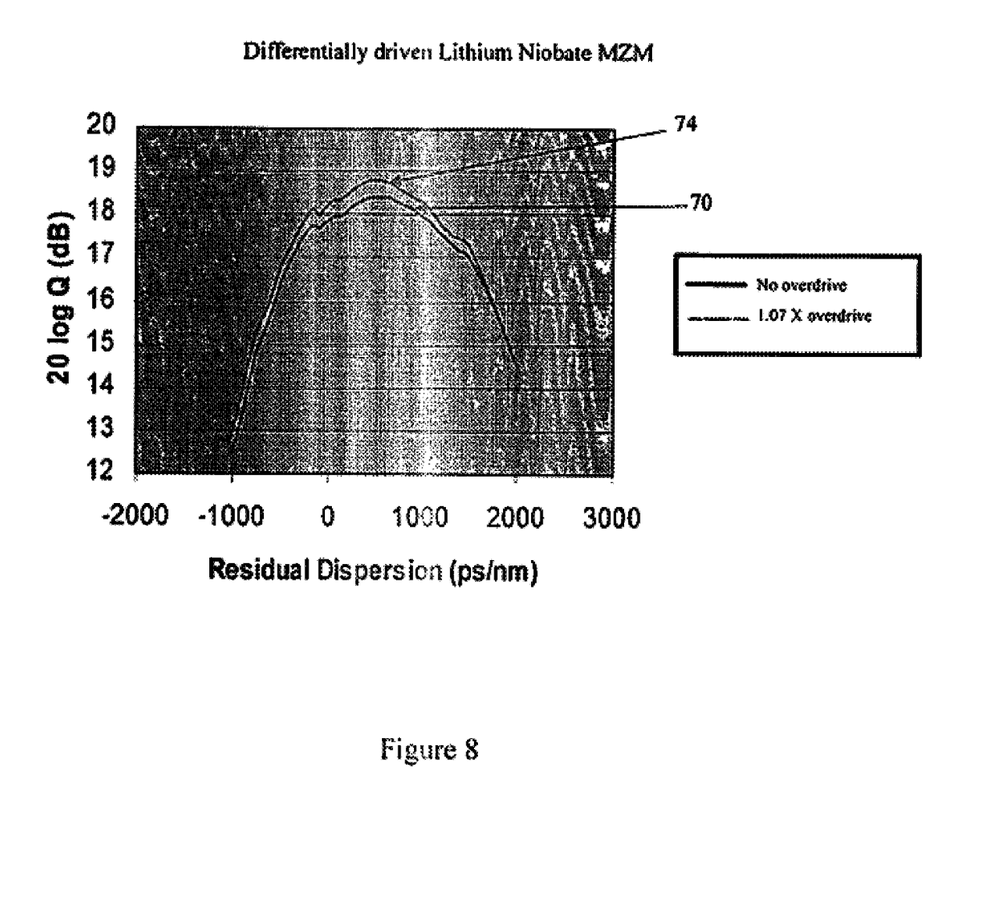
FIG. 8 illustrates simulations of optimized bit error rate (Q) versus residual dispersion as a function of modulation driving conditions for a lithium niobate Mach-Zehnder modulator.

FIG. 8 illustrates the result of a modeling simulation that graphically depicts the improvement in signal quality (Q factor) realized by differentially overdriving a lithium niobate MZM as measured against fiber residual dispersion. As FIG. 8 illustrates, when the lithium niobate MZM is differentially overdriven by a factor of 1.07 (to produce a reduced ER), the Q factor of the modulated optical signal is illustrated by curve 74. In contrast, curve 70 illustrates the Q factor of the modulated optical signal when the same lithium niobate MZM is differentially driven at its maximum modulation voltage (maximum ER).

Figure 9:
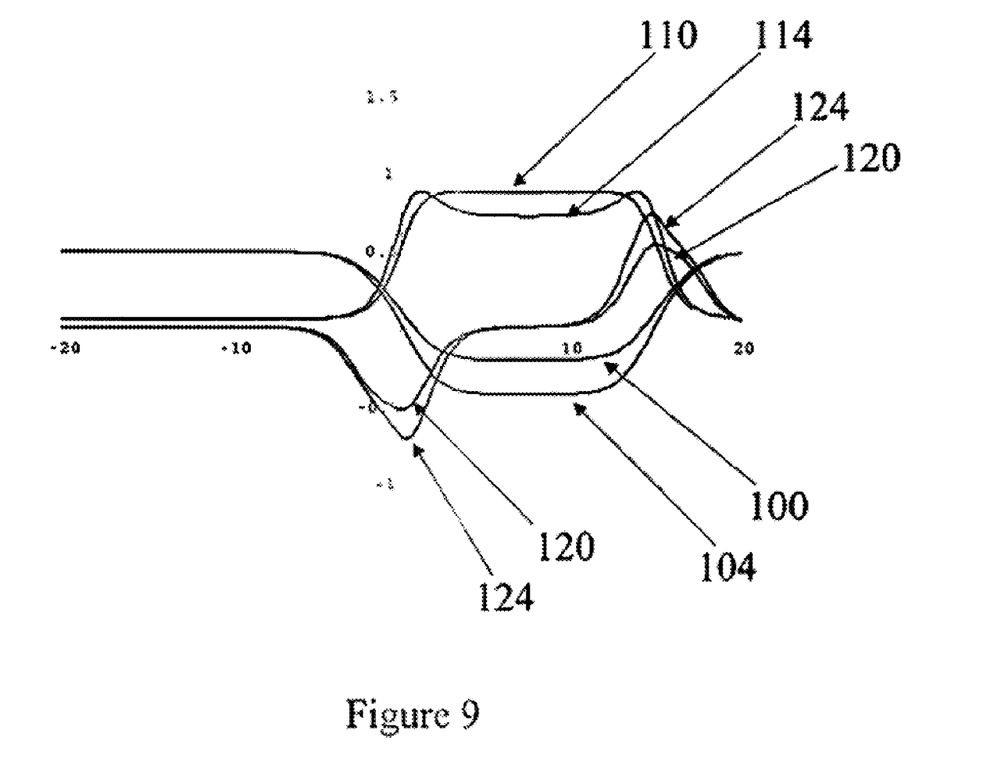
FIG. 9 graphically illustrates simulations of the phase, intensity, and frequency emerging from a negative chirp parameter semiconductor MZM driven to maximum extinction ratio and an overdriven semiconductor MZM.

FIG. 9 graphically depicts effects of overdriving a semiconductor MZM based on the results of a modeling simulation. Before proceeding with the discussion of FIG. 9, it is helpful to first explain the plotting scheme of the disparate signals. In order to overlay three types of plots to see their time overlap, the plots are normalized and units are abandoned. The horizontal axis (abscissa) is considered in units of time. However, the time scale has been divided by an appropriate unit of time to render the horizontal scale a dimensionless quantity. The vertical axis (ordinate) is considered frequency for curves 120 and 124, phase for curves 100 and 104, and intensity for curves 110 and 114. Since a single scale with such disparate units is not easily obtainable, the curves are "normalized" by dividing each of the frequency plots by some unit of frequency to render the plot over a range, such as −1 to +1.

Likewise, the phase curves are divided by some unit of phase, to render its plots over an acceptable range, such as −1 to +1. Similarly, for intensity, each of the intensity curves is divided by some unit of intensity, to render its plots over an acceptable range, such as −1 to +1. Thus, the vertical scale is also a dimensionless quantity with arbitrary units. The plots are overlaid and compared to each other in time (to see the synchronous behavior) since they all have the same start and end point and have been normalized or divided by the same time factor. Insofar as the vertical dimension is concerned, the comparisons should take place only in a curve type, e.g., compare phase curves to each other insofar as their amplitude is concerned, or intensity curves to each other, or frequency curves to each other. Relative, not absolute information is obtained by comparisons among curves of a single type.

By plotting the results, curves 100 and 104 illustrate the phase of a light wave as it emerges from the semiconductor MZM driven at maximum ER and overdriven by approximately 29%, respectively. On the same plot, curves 110 and 114 illustrate the intensity of the light as it emerges from the semiconductor MZM driven at maximum ER and overdriven by 29%, respectively. The overdriven curve 114 is shown to produce a lower extinction ratio by virtue of its reduced amplitude over the majority of its high state of light intensity relative to the curve 110. Again, using the same plot, curves 120 and 124 illustrate the frequency deviation of the light wave as it emerges from the semiconductor MZM, with earlier emergence times depicted by the waveforms below the horizontal axis and the later emergence times depicted by the waveforms above the horizontal axis for the case of maximum ER and overdriven by 29%, respectively. It will be observed that the overdriven curve 124 produces a greater deviation in frequency components than for the case of driving at the maximum extinction ratio, curve 120. Furthermore, it will be observed that the deviations in frequency for curve 124 occur at higher intensity portions of the lightwave 114 (as observed by their overlay in time), than for the case of the semiconductor MZM modulator driven to maximum ER, as observed by the overlay of curve 120 and curve 110.

As shown in FIG. 9, for the exemplary MZM 10, the frequency components produced at the leading edge of the modulating voltage pulse are negative, that is, at a lower frequency relative to the lightwave carrier frequency. Such lower frequency components travel at a slower rate than the carrier frequency in positive dispersion fiber. As such, as the lightwave propagates over such fiber, the lightwave frequency components at the center of the modulated pulse begin to catch up with the leading edge of the pulse. Similarly, at the falling edge of the modulated light pulse, higher frequency components are produced by this negative chirp parameter modulator. Such frequency components travel at a faster rate than those at the center of the pulse. Thus, the trailing edge of the pulse catches up with the center of the pulse as it begins propagation over positive dispersion fiber. These two effects, the leading edge of the pulse being overridden by the center of the pulse, and the trailing edge of the pulse overriding the center of the pulse, serve to increase the extinction ratio and open the optical eye when propagated over fiber. Overdriving the exemplary MZM 10 enhances these effects even further, by virtue of increasing the frequency shifts and producing those shifts at higher lightwave intensities. Thus, while overdriving the exemplary MZM 10 decreases the ER before propagation over fiber, the frequency changes (chirp) produced on the light pulse by such overdriving actually enhances the ER after propagation over fiber. Those skilled in the art will recognize that this effect would work equally well for a positive chirp parameter modulator and negative dispersion fiber.

While the present invention has been described with reference to a preferred embodiment thereof, one skilled in the art will recognize that various changes in form and detail may be made without departing from the intended scope of the present invention as defined in the pending claims. For example, the techniques employed here for a negative chirp parameter modulator and positive dispersion fiber are transferable to positive chirp parameter modulators and negative dispersion fiber to generate a modulated optical signal with a less than maximum ER.

What is claimed is:

1. A method of processing an optical signal in an optical communications network, said method comprising the steps of:

inputting said optical signal to an input of a modulator; and overdriving said modulator with a modulation voltage signal value to produce a modulated optical signal having an extinction ratio reduced from maximum as measured before propagation over the optical communications network, wherein said modulated optical signal having said extinction ratio reduced from maximum yields a bit error rate improvement at a receiver of said modulated optical signal after propagation over the optical communications network.

2. The method of claim 1 further comprising the step of, transmitting said modulated optical signal across an optical medium to a receiver, wherein said receiver receives said modulated optical signal having an eye with a compressed central portion.

3. The method of claim 1, wherein said modulator comprises a Mach-Zehnder Modulator (MZM).

4. The method of claim 1, wherein said optical communication network transmits said modulated optical signal at about an OC-192 rate, whereby the use of forward error correction may increase the data rate from its standard OC-192 value of 9.95328 Gbps by up to approximately 25%.

5. The method of claim 1, wherein said optical communications network transmits said modulated optical signal at about an OC-48 rate, whereby the use of forward error correction may increase the data rate from its standard OC-48 value of 2.488 Gbps by up to approximately 25%.

6. The method of claim 1, wherein said optical communications network transmits said modulated optical signal at about an OC-768 rate, whereby the use of forward error correction may increase the data rate from its standard OC-768 value of 39.81 Gbps by up to approximately 25%.

7. The method of claim 2, wherein said optical medium comprises a single mode optical fiber.

8. A method for improving a bit error rate of an optical signal transmitted over an optical transmission medium said method comprising the steps of:

providing a stabilized light beam to an optical modulator;

asserting at said optical modulator a modulation drive signal having a peak-to-peak voltage value; and improving said bit error rate of said optical signal transmitted across said optical transmission medium by increasing said peak-to-peak voltage value of said modulation drive signal to overdrive said optical modulator to cause said optical signal to have a reduced extinction ratio as measured before propagation over said optical transmission medium to a receiver coupled to the end of said optical transmission medium.

9. The method of claim 8, wherein a laser diode provides said stabilized light beam.

10. The method of claim 8, wherein said optical modulator comprises a semiconductor Mach-Zehnder modulator (MZM).

11. The method of claim 8, wherein said optical conductor comprises a single mode optical fiber.

12. The method of claim 8, wherein said optical modulator comprises a lithium niobate Mach-Zehnder modulator (MZM).

13. The method of claim 8, wherein said optical modulator comprises a polymer-based Mach-Zehnder modulator (MZM).

14. The method of claim 8, wherein said optical modulator supports a modulation rate at about OC-192, whereby the use of forward error correction may increase the data rate from its standard OC-192 value of 9.95328 Gbps by up to approximately 25%.

15. The method of claim 8, wherein said optical modulator supports a modulation rate at about OC-48, whereby the use of forward error correction may increase the data rate from its standard OC-48 value of 2.488 Gbps by up to approximately 25%.

16. The method of claim 8, wherein said optical modulator supports a modulation rate at about OC-768, whereby the use of forward error correction may increase the data rate from its standard OC-768 value of 39.81 Gbps by up to approximately 25%.

17. A method for modulating an optical carrier wherein said method yields an improved bit error rate for said modulated optical carrier said method comprising the steps of:

asserting said optical carrier at an optical input of an optical modulator; and overdriving said optical modulator with a modulation voltage signal to produce said modulated optical carrier, whereby said overdriving of said optical modulator causes said modulated optical carrier to have a less than maximum extinction ratio to improve said bit error rate of said modulated optical carrier as received by a receiver of said optical carrier.

18. The method of claim 17, wherein said optical modulator is a semiconductor Mach-Zehnder modulator (MZM).

19. The method of claim 17, wherein said optical modulator is a lithium niobate Mach-Zehnder modulator (MZM).

20. The method of claim 17, wherein said optical modulator is a polymer-based Mach-Zehnder modulator (MZM).

21. An apparatus for modulating an optical carrier, said apparatus comprising of:
an optical modulator; and
a drive voltage controller to control a modulator voltage value supplied to said optical modulator to cause said optical modulator to produce a modulated optical carrier having an extinction ratio reduced from a maximum as measured before propagation over a single mode fiber, wherein said modulation voltage value supplied to said optical modulator exceeds a voltage value necessary to produce said maximum extinction ratio.

22. The apparatus of claim 21 wherein said optical modulator is a Mach-Zehnder modulator (MZM).

23. The apparatus of claim 22 wherein said MZM comprises one of a semiconductor MZM, a lithium niobate MZM and a polymer-based MZM.

24. The apparatus of claim 21 wherein said extinction ratio reduced from said maximum produces an improved bit error rate as measured at a receiver of said modulated optical carrier after propagation over fiber.

* * * * *